United States Patent Office 3,021,161
Patented Feb. 13, 1962

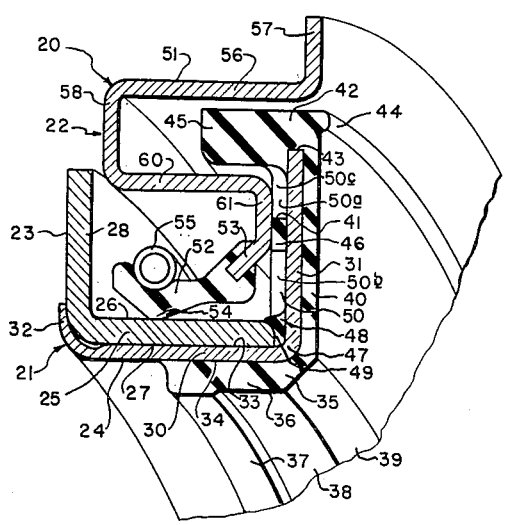

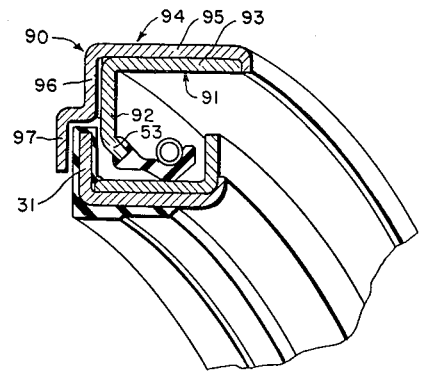
FIG. 6
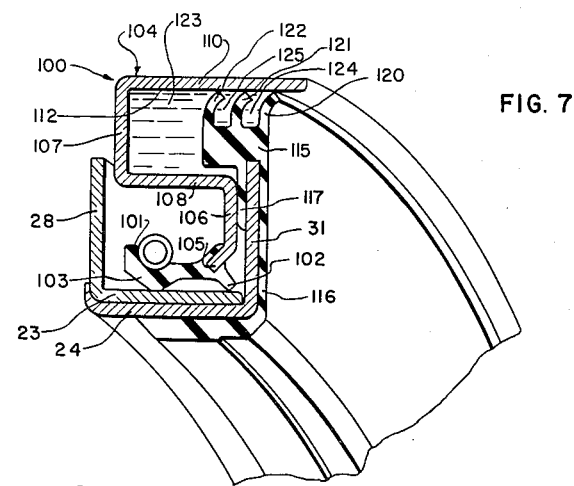
FIG. 7
FIG. 8
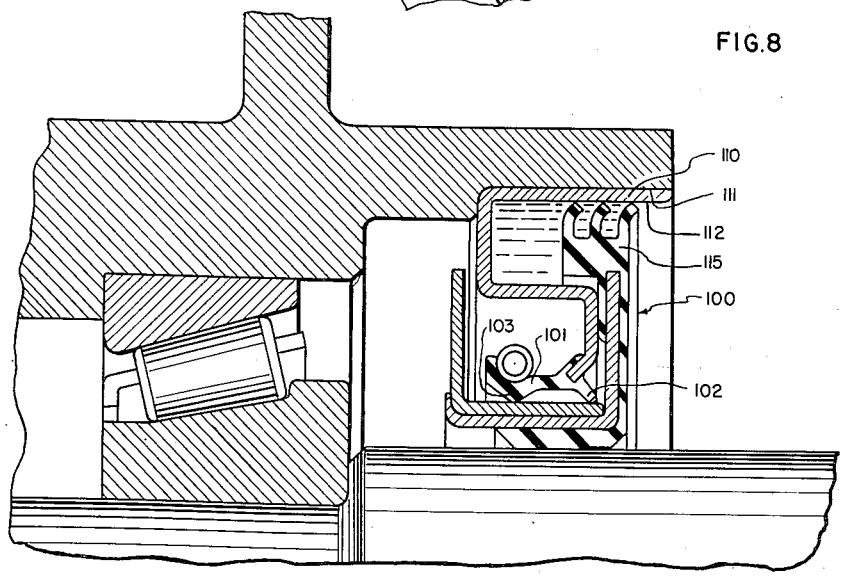

3,021,161
UNITIZED SHAFT SEAL
George D. Rhoads, Redwood City, Vasalie L. Peickii, Hillsborough, and Brian H. Carson, Woodside, Calif., assignors to Federal-Mogul-Bower Bearings, Inc., Detroit, Mich., a corporation of Michigan
Filed Sept. 14, 1959, Ser. No. 839,784
6 Claims. (Cl. 277—37)

This invention relates to improvements in unitized radial shaft seals.

The patent application Serial Number 669,018, filed July 1, 1957, by Corsi and Rhoads, relates to a unitized radial shaft seal, the first of its kind. The present invention provides improvements that have particular utility in certain environments where they produce some very unusual results.

For example, seals of the present invention are especially useful in automobile differentials for sealing the pinion lubricant. Heretofore, the very high rotational speed of the pinion has led to several difficulties. Proper lubrication of the shaft seal as well as of the moving parts in the axle has been difficult, so that an additional element has had to be provided; the present invention makes it possible to do away with this separate element. The speed of the pinion has made it difficult to retain the lubricant and has made it essential to keep dust and dirt out of the rotating parts. The present invention not only keeps the lubricant inside the pinion assembly, but also provides structure that keeps out the dirt, dust, rocks, sand, and moisture which have tended to get in and wear the parts. Heretofore, considerable difficulties were caused by the heat that was generated by the rotational friction between the shaft and the lip of the sealing device and by the heat that was transmitted from the gears and bearings along the shaft to the oil seal. This invention solves both these problems by (1) insulating the oil seal from the shaft and (2) providing an unusual structure that dissipates the heat generated at the sealing lip.

The invention also solves the problem of providing a good sealing surface in rotary engagement with the radial oil-sealing lip. It has been found that where cylindrical surfaces were ground with the intention of providing a suitable sealing surface, unexpected difficulties ensued; elastomeric oil seals had unexpectedly short lives and began leaking much too early. Apparently, grinding tears away surface portions of the metal, so that, although it may appear smooth, it is actually covered by a number of very sharp burrs of microscopic dimensions; these burrs cut into the oil-sealing lip and wear it rapidly. Furthermore, while the shaft is advanced through the grinder, a helical path is produced, somewhat resembling a screw-thread, though very shallow. This thread-like path has been found to be the source of some hitherto untraceable leakage, for it has been found that the lubricating oil tends to follow this screw-thread pattern and, especially in instances where the thread is moving outwardly during rotation of the shaft, the oil tends to leak past the oil seal via this path, however good the radial shaft seal itself may be. The present invention completely eliminates the necessity for such expensive operations as grinding, polishing, lapping, and reversing directions, since the unitized seal of this invention provides its own sealing surface on a wear sleeve forming part of the unitized seal assembly and there is no reliance on the smoothness of the shaft itself.

Another important problem solved by this invention has to do with the provision of a good cylindrical surface on the wear-sleeve that forms part of the unitized seal assembly. As explained in patent application Serial Number 669,018, a rubber lining is preferably provided to enable a leak-proof and scratch-proof installation of the wear sleeve on the shaft. However, it has been found that when a sleeve is directly lined with an elastomer, flash gets on the sleeve surface that is to be in contact with the sealing lip; then it is essential to deflash the sleeve, usually by grinding it. Grinding the wear sleeve leads to the same kind of sharp-wearing burred surface that is produced by grinding the shaft. In the present invention, an unground, non-bonded wear-sleeve is used in combination with a rubber-lined sleeve that is locked inside the wear-sleeve. Not only is the flash problem eliminated, for flash does no harm on this inner sleeve, but also the wear sleeve itself provides an as-drawn, work-hardened cylindrical steel surface for rotary contact by the lubricant-retaining lip. Economically, the invention is attractive, for it eliminates grinding or turning the wear sleeve and cleaning rubber-flash and bonding cement from the critical area. Moreover, it provides a sealing surface that is actually superior in operation with an elastomeric sealing lip, to most ground surfaces. Being formed by drawing, the wear sleeve may have somewhat larger run-out than a ground shaft, but it is smooth and has no torn edges. It has been found by actual test that an elastomeric lip seals better against the as-drawn wear-sleeve of this invention than against ground wear-sleeves.

Furthermore, the life of the sealing lip and wear sleeve is prolonged by the use of the as-drawn work-hardened surface, since both the lip wear and sleeve wear are greatly reduced over that normally encountered on production-ground finishes. This is due in part to the greater wear resistance of the work-hardened skin that remains on the "as-drawn" wear sleeve after drawing.

The invention also solves some important problems in slow-speed installation such as on tractor drives where it has been found, for example, in the final drive of a crawler that the seal sometimes has to operate under as much as a foot of mud or dirt or sand, which heretofore has tended to get past the seal into the bearings where it has caused much greater difficulties than those met in the retention of the lubricant. In the present invention, the unitized lubricant retainer includes adequate dust-sealing and dirt-sealing lips and labyrinthine passages. Furthermore, the seal provides means for lubricating these dirt-sealing lips. Furthermore, the invention incorporates an integral rock-shield, as a part of the wear-sleeve assembly.

In any environment, an important feature of this invention is that the wear-sleeve assembly is automatically located in the proper axial position to the remainder of the seal assembly, and maintains that position during the life of the seal.

From the foregoing it will be seen that an important object of the invention is to provide a shaft-seal of the radial type having a longer operating life, and that this object is achieved partly by providing better lubrication of the sealing lip against the sealing surfaces, and partly by providing lower lip-wear-sleeve operating temperatures than can be obtained from conventional shaft-seals.

Another important object of this invention is to provide a seal which can be used in much higher-speed environments than can comparable prior-art seals, due to the better lubrication, the lower operating temperatures, and the longer effective life of this new seal combination.

Another object of the invention is to assure exclusion of dirt and moisture from the critical lip-contact areas.

Basically, the invention comprises a unitized shaft-seal that prevents lubricant loss from between two relatively rotating members, and also protects the rotating members from the ingress of foreign matter between them. The unit provides a pair of radial flanges that protect the sealing members, not only during operation, but also during shipping and installation. Two metal members, each having a cylindrical portion and a radial flange, are nested together and, in some cases, gasketed together as well. One of these metal members is provided with an elastomeric lining, assuring snug engagement with one of the rotating members, whether the shaft or the bore; preferably, this lining also covers one or both sides of the radial flange. The other annular metal member has no elastomer bonded to it, but is clamped to the lined metal member. This unbonded member provides a cylindrical as-drawn wear-sleeve surface on which the seal rides, and also provides a radial flange that serves as an integral oil slinger and heat dissipator. The seal itself has a metal case or supporting member and is provided with a sealing-lip which engages the unbonded, as-drawn wear-sleeve. The case is preferably shaped to limit the axial movement relative to the wear-sleeve assembly by engaging that assembly when moved in either axial direction. This enables both installation and removal of the seal in the easiest manner, and without damage to the sealing-lip.

Other features, objects and advantages of the invention will be brought out in the course of the following description of some preferred embodiments thereof, while still others will be clearly apparent to the man in the art who reads the description and studies the drawings.

In the drawings:

FIG. 1 is a fragmentary view in perspective of a unitized seal embodying the principles of the invention.

FIG. 2 is a reduced end elevation view of the seal of FIG. 1.

FIG. 3 is a fragmentary view in elevation and in section of the seal of FIG. 1 installed adjacent a bearing in an automobile differential.

FIG. 4 is a view similar to FIG. 1 of a modified form of unitized seal, also embodying the invention.

FIG. 5 is a view similar to FIG. 1 of another modified form of seal of the invention.

FIG. 6 is a view similar to FIG. 1 of still another modified form of seal.

FIG. 7 is a view similar to FIG. 1 of a further embodiment of a seal of this invention.

FIG. 8 is a view like FIG. 3 of an installation incorporating the seal of FIG. 7.

FIGS. 1 to 3 show a unitized seal 20 having a wear-sleeve assembly 21 and a sealing assembly 22. The wear-sleeve assembly 21 includes two nested, flanged, annular, metal sleeves or rings 23 and 24. The sleeve 23 is provided with a cylindrical portion 25 having an outer sealing surface 26 and an opposite radially inner surface 27.

A radial flange 28 extends from one end of the cylindrical portion 25 giving the sleeve 23 a general L-shape, as seen in cross-section. Preferably, the sleeve 23 is formed by drawing a flat, annular steel ring; the drawing is done by exertion of force on the side 27 so that any scratches which may be produced on that side do not affect the sealing surface 26. If the surface 26 does have some minor undulations, they are insignificant and do not contribute to wear of the sealing lip. Thus, a smooth sealing surface is provided without any necessity whatever for grinding. The flange 28 serves as an oil slinger to lubricate both the sealing surface 26 and the rotating parts, such as are shown in FIG. 3.

The sleeve 24 is also generally L-shaped in cross-section, having a cylindrical portion 30 and an axial flange 31. After assembly of the sealing assembly 22 into the assembly 21, a free end 32 of the cylindrical portion 30 is turned to clamp the sleeve 23 tightly to the sleeve 24, but during the initial stage of operation the free end 32 is cylindrical and part of the portion 30. The cylindrical portion 30 has an outer surface 33 and a radially inner surface 34, the surfaces 33 and 27 being snugly engaged, while the surface 34 faces the shaft.

The surface 34 is covered by an elastomeric liner 35, which provides a stepped lining 36 over the surface 34, having a smaller-diameter portion 37 and a larger-diameter lead-in portion 38 and also, preferably, a chamfered entry portion 39. The chamfer 39 and lead-in portion 38 makes it easy to install this seal on a shaft, while the portion 37 grips the shaft quite tightly and assures a snug sealing engagement preventing the passage of oil.

The lining 35, however, is preferably not confined to the cylindrical surface, but is extended up onto, in this instance, both sides of the radial flange 31, providing an outer covering 40 and an inner covering 41. The outer covering 40, in this instance, is continuous and completely covers the outer surface of the radial flange 31, thereby protecting the metal from exposure to corrosion. The lining 35 also provides a portion 42 extending beyond the radially outer end 43 of the radial flange 31. The portion 42 has a short, thin axially outwardly extending portion 44, which extends axially beyond the sealing assembly 22, and a long and thick axially inwardly extending portion 45. The portion 41 includes a bumper-portion 46, whose purpose will be explained later and, adjacent a corner 47 where the radial flange 31 and cylindrical portion 30 meet, a gasket portion 48 which, during assembly of the wear-sleeve, is snugly engaged by the end edge 49 of the wear-sleeve 23, to provide a gasket that prevents any leakage of oil that might occur between the two sleeve surfaces 27 and 34 from escaping beyond the seal. Preferably, a series of slots 50 and 50a are provided in the surface 41, respectively between the portions 46 and 48 and between the portions 46 and 45 to enable location of the flange 31 in the mold and also for other purposes that will be explained later. The slots 50 and 50a leave chaplets 50b and 50c.

The sealing assembly 22 comprises an annular metal washer or case 51 and an elastomeric sealing member 52. Various structures may be used for the elastomeric sealing member 52, the one shown being a preferred structure and being that which is described and claimed in a copending patent application, Serial Number 639,276, filed February 11, 1957, by Robert N. Haynie. In this form of sealing member, the elastomeric sealing member is bonded to an angularly extending flange 53 of the case 51 and is provided with a sealing-lip 54 which rides on the surface of the wear-sleeve 23. It is preferably held in engagement therewith by a spring 55 of the garter type, such as is conventional in oil seals.

The case 51 as shown, has an outer cylindrical portion 56 engaging a bore, and an outer radial flange 57 preventing insertion beyond a desired limit. The cylindrical portion 56 is connected to an outer radial portion 58, which is closer to the flange 28 than the elastomeric member 52, and will engage it first to protect the elastomeric member from damage. An inner cylindrical portion 60 connects the radial portion 58 to an inner radial portion 61, which is adapted to engage the bumper 46. The angularly extending portion 53 extends from the inner radial portion 61.

FIG. 3 shows the seal 20 installed in an automobile differential. A pinion shaft 63 is splined to a companion flange 64, a portion of a universal joint. A pinion carrier 65 is mounted around the shaft 63 by an anti-friction bearing 66. The pinion carrier 65 provides a bore 67 in which the cylindrical case portion 56 fits snugly, the radial flange 57 engaging an end wall 68 of the pinion carrier 65 to limit insertion of the seal assembly 20. The lining portion 37 engages a cylindrical outer surface 69 of the pinion carrier 64. During installation, the pilot portion 38 and chamfer 39 facilitate proper alignment and make it easy to provide a snug fit without difficulty. The oil is on the bearing side of the seal lip 54.

It will be seen, that the oil is sealed by the rotary engagement of the lip 54 against the wear-sleeve surface 26, so that no leakage occurs at this point; that the gasket 48 prevents leakage between the sleeves 24 and 23; that the cylindrical portion 56 of the case 51 seats snugly in the bore 67 and that the wear sleeve liner 36 hugs the shaft surface 69, so that there is no possibility of leakage past the seal 20.

The annular radial flange 28 acts as an oil-slinging member, which slings oil out centrifugally and splashes it both into the seal 20 and into the bearings 66 on the opposite side of the seal from the flange 28. This assures lubrication of the seal lip 54, which is very important, and also enables elimination of the separate oil-slingers which, heretofore, had to be used in pinion applications to obtain satisfactory lubrication of either the bearings or the seal. The flange 28 also provides a large external surface to radiate and conduct frictional heat away from the sealing area. Thus, the slinger 28 runs in oil and creates a spray which lubricates and also carries away heat from the slinger 28 and thus cools the sealing-lip 54 and the sleeve 23.

Some appreciation of the effectiveness of the flange 28 can be gathered from some tests run on Ford automobile axles at Ford acceptance test standards, with the pinion speed corresponding to a consistent road speed of 85 miles per hour. Seals like those in FIG. 1 were compared with seals identical to them but with the flange 28 ground away. The seals with the flange 28 had at least five times the seal life of the same seals without the flange. Without the flange, 50–70% of the seals failed within 50 to 100 hours; with the flange, all the seals tested ran more than 1,000 hours before failure; some ran more than 2,000 hours without failure, their total life depending chiefly on the axle temperature.

The rubber lining 36 between the wear-sleeve 21 and the shaft surface 69 serves both as a driving medium, as a gasket against leakage, and as locating means for the sleeve assembly 21, retaining it in proper concentric position during installation and operation. The rubber lining 36, in addition to being an effective means for providing fluid-tight installation of the unit 20 on a shaft and enabling it to accommodate normal shaft runout tolerances, such as metal-to-metal installations are unable to do, also serves to dampen the vibrations between the sealing-lip 54 and the wear-sleeve 21, which tend to cause pinion-squeal. In those applications where shaft temperatures are higher than the lubricant temperatures, the rubber liner 36 additionally protects the sealing lip 54 by insulating it from the shaft. The lower seal-lip operating temperatures lengthen the seal life.

The rubber liner portion 40 provides an abrasion-resistant protection to the rock shield provided by the radial flange 31. In combination, the flange 31 and liner portions 40, 41, 42, and 44 provide a labyrinth that keeps dirt, water, and other foreign materials from the critical area around the sealing lip 54. The bumper 46 gaskets against the case portion 61 in the initial operation, but it soon wears off so that it does not impede rotation; but, even then, the clearance is so small that dirt, dust, and moisture cannot get into the seal. The gasket 46 also engages the case portion 61 to take axial installation force and limit relative movement in one direction. In the other direction, movement is limited by engagement of the radial case portion 58 with the flange 28.

The protruding ridge 43 of the rubber-liner slings mud, water, etc., beyond the seal and beyond the labyrinth area. This ridge 43 can readily be deformed during installation, without permanent damage to the seal.

The flange 31 and liner 35 provide a large, rotating external surface which radiates and conducts frictional heat away from the sealing-lip area to the outside air, thereby aiding the flange 28 in cooling the seal lip 54 and imparting to the seal 20 a lower operating temperature.

It will further be noted that the metal wear-sleeve 23 provides a smooth, wear-resistant surface 26 for the sealing-lip, lends mechanical support and protection to the sleeve assembly 21, encloses and protects the seal assembly 22 during operation, storage, handling, and shipping, provides a shoulder 49 that forms a leak-proof gasket between the two components 24 and 23 of the wear sleeve assembly 21.

The wear-sleeve 21 itself is assembled by inexpensive mechanical clamping of the two portions 24 and 23, which hold themselves together and also unitize the seal-sleeve assembly 20. The slots 50 and 50a enable the mold to support the metal flange 31 of the rock-shield during the operation of molding the liner 35.

FIG. 4 shows a modified form of seal 70, generally like the seal 20 but with a few differences. The seal unit 71 has a case 72 that is shaped differently from the case 50. The lip anchor portion 53 is joined to a short radial portion 73 which is connected by an axial offset portion 74 to an outer radial portion 75. The radial portion 75 is connected directly to a cylindrical portion 76. The radial portion 75 is also welded to a flat washer 77 having a radially outer portion 78a corresponding in function to the case portion 57.

The liner portions 40 and 41 are present, substantially as before, but the portions 42, 43, and 44 are replaced by a portion 78 that is connected directly to the bumper portion 46, which engages the radial portion 73. Instead of the case portion 58 engaging the flange 28 to limit axial movement in one direction, that function is provided by the washer 77 engaging the liner portion 40. Some liquid vent openings 79 may be provided, usually in the lower end only, however. Thus, the washer 77 helps further in providing a labyrinthine path preventing entrance of foreign matter into the seal 70.

A seal 80, shown in FIG. 5, is also basically similar to the seal 20. The flange 28 is offset, but that is not significant. The case 81 has a radial portion 82, an axial offset 83, and a radial portion 84, which is connected to a cylindrical portion 85 by a portion 86 serving the function of the case portion 57 in FIG. 1. A case portion 87 is hooked over to engage the flange 28 before the flange can engage the sealing member during axial withdrawal. Also, no special complete-ring bumper portion is provided on the lining, the portion 88 being chapleted. Less effective than the seal 20, the seal 80 has its uses where the conditions are less rigorous, for it is less expensive to make.

FIG. 6 shows a seal 90, also basically similar to the seal 20. Its case 91 has the portion 53 connected to a radial flange 92, which is connected to a cylindrical portion 93. The case 91 is clamped into a case 94, with a cylindrical flange 95, a radial flange 96, and an axially offset radial flange 97. The flange 31 lies between the radial flanges 92 and 97, and thereby limits axial movement and provides a labyrinthine passage. Otherwise, it is basically similar to the seals already discussed.

FIGS. 7 and 8 show another modified form of seal 100 embodying the principles of the invention. In this instance the seal element 101 has a dust-sealing lip 102 as well as a lubricant-sealing lip 103. The lip 102 may be included in the other modifications shown, or it may be omitted in this one. It does give some additional protection and is a good thing to have, but it is not always essential.

The seal case 104 has a lip-supporting flange 105, a radial portion 106 connected to the flange 105 and to another radial portion 107 by an axially extending portion 108. It also has a cylindrical portion 110 which fits into the bore 111 of the installation and which itself provides a bore-like cylindrical surface 112 for a novel multi-lip sealing element 115, which is preferably but not necessarily formed as integral with the lining 116.

In this instance, the multi-lip sealing element 115 is supported by the flange 31 and itself provides a bumper portion 117. However, the lining 116 is not otherwise carried over to the other side of the flange 31 and there is no gasketing between the two annular members 23 and 24 comprising the wear sleeve. In this particular instance a slight leakage of oil such as might occur between these two sleeves 23 and 24 is not at all undesirable, because that will assist in lubricating the outer dirt seal 115.

The multi-lip sealing element 115 itself may have one, two, three, or more lips 120, 121, 122 as desired, the three-lip construction being shown as a preferred form. The seal 100 is unitized and when assembled the space 123 between the inner lip 122 of the sealing element, the cylindrical portions 108 and 110 of the case, and the radial portion 107, is filled with grease; so are the spaces 124 and 125 between the lips. This assures lubrication of the lips. The lips 120, 121, and 122 give a very effective exclusion of dirt and dust.

The seal 100 is preferably used in installations where dirt and dust are a real problem and especially in such slow-speed installations as the final drive of tractors where the tractor has to work in considerable mud or dirt. The seal of this invention has been found effective even though working below a foot or more of mud or sand or slush. Thus, in this instance there is a lubricant-sealing lip 103 moving against the wear sleeve 23 as well as the dust-excluding safety lip 102 also moving against the wear sleeve 23, and there are three dirt and dust-excluding lips 120, 121, and 122 moving against the surface 112 provided by the cylindrical part 110 of the case 102. By properly forming the case 104 by normal drawing procedures, this surface 112 can be as effective for sealing as the surface of the wear sleeve 23.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting. For example, the sealing element 52 may in some instances be of leather or other materials than elastomers. Furthermore, various types of internal sealing elements may be used instead of the multi-lip elastomeric element 115.

What is claimed is:

1. In a plural-part annular unitized seal assembly for preventing lubricant loss between two relatively rotatable machine members, an outer annular casing part having a stationary leak-tight fit with one said machine member and an annular radial flange surrounding the second said machine member, an inner annular casing part within said outer casing part having an annular radial flange at one side thereof in opposed relation to said flange of said outer casing part, an annular resilient lip element secured to and extending from said flange of said outer casing part to sealing engagement with said inner casing part, and an annular two ply mounting sleeve assembly laminated on said inner casing part including an elastomeric facing ply for resilient mounting thereof in engagement with the other of said machine members, whereby said unitized seal assembly may be produced without flash or other deleterious effect on any of said casing parts.

2. The device according to claim 1 wherein said mounting sleeve assembly has a radial flange in opposed relation to said flange of said outer casing part, and an elastomeric facing bonded to said flange of said mounting sleeve and extending into sealing engagement with said flange of said outer casing part.

3. A unitized shaft seal for preventing lubricant loss from between two relatively rotating members while also protecting them from the ingress of foreign matter between them, including in combination: two annular metal members, both L-shaped in cross-section to provide a cylindrical portion and a radial flange, said metal members being nested together with the outer surface of the cylindrical portion of one snugly against the inner surface of the cylindrical portion of the other, said metal members being secured against relative axial and rotative movement, their radial flanges being at opposite ends; an elastomeric lining for the surface of a cylindrical portion of one said metal member on the opposite side from that engaging the cylindrical portion of the other metal member and from the direction in which the radial flanges extend and adapted to snugly engage one said rotating member; a shaft-sealing assembly adapted to engage the other said rotating member and comprising a third metal member and a sealing lip supported by said third metal member in rotary sealing engagement with the surface of said cylindrical portion of the unlined said nested metal member, which lies on the opposite radial side from the lining, said lip and at least a portion of the third metal member lying axially between said radial flanges, said third metal member also providing a cylindrical portion, spaced radially from said nested members; and an elastomeric member integral with said lining providing an annular sealing lip that engages the cylindrical portion of said third metal member, said lining also covering the radial flange of the metal member whose cylindrical portion it lines, on the surface of said flange that faces away from said sealing assembly, said elastomeric member being supported on the same said radial flange as the one said lining lines.

4. The seal of claim 3 wherein said lining also has a portion on the opposite surface of the same said radial flange that is gasketed to said third metal member.

5. A unitized shaft seal for preventing lubricant loss from between two relatively rotating members while also protecting them from the ingress of foreign matter between them, including in combination: two annular metal members, both L-shaped in cross-section to provide a cylindrical portion and a radial flange, said metal members being nested together with the outer surface of the cylindrical portion of one lying snugly against the inner surface of the cylindrical portion of the other, said metal members being secured against relative axial and rotative movement, their radial flanges being at opposite ends; an elastomeric lining for the surface of a cylindrical portion of one said metal member on the opposite side from that engaging the cylindrical portion of the other metal member and from the direction in which the radial flanges extend and adapted to snugly engage one said rotating member; and a shaft-sealing assembly adapted to engage the other said rotating member and comprising a third metal member and a sealing lip supported by said third metal member in rotary sealing engagement with the surface of said cylindrical portion of the unlined said nested metal member, which lies on the opposite radial side from the lining, said lip and at least a portion of the third metal member lying axially between said radial flanges; and an elastomeric sealing lip supported by the said radial flange of one said nested metal member, at the opposite radial extreme from said cylindrical portion, said lip and said lining being integral.

6. A unitized shaft-seal for preventing lubricant loss from between two relatively rotating members while also protecting them from ingress of foreign matter between them, including in combination: a first annular metal member L-shaped in cross-section to provide a cylindrical portion and a radial flange having axially inner and outer surfaces; an elastomeric member bonded to said first metal member to provide a stepped lining for said cylindrical portion, said lining adapted to snugly engage one of said rotating members, to cover an outer surface of said radial flange, to extend therebeyond and provide a dust-sealing lip means, and to cover a portion of said inner surface; a second annular metal member having a cylindrical portion nested in the cylindrical portion of said first metal member with the unlined cylindrical surface of the first said cylindrical portion in snug contact with the other said cylindrical portion, and having a radial flange at the opposite end of said cylindrical portions from the radial flange of said first metal member, said first metal member having the free end of its cylindrical portion bent to lock said second metal member to said first metal member, said first and second metal members and said first elastomeric member comprising together a wear-sleeve assembly; a shaft-sealing assembly comprising a third metal member and an elastomeric lubricant-sealing lip supported by said third metal member in rotary sealing engagement with said cylindrical portion of said second metal member, said shaft-sealing assembly having a portion engaging the other said rotating member, said third metal member having a portion lying between said radial flanges of said first and second members and gasketed against the elastomeric-lined portion of said inner surface of said lined flange and having a cylindrical portion engaged by said dust-sealing lip means.

References Cited in the file of this patent

UNITED STATES PATENTS

| | | |
|---|---|---|
| 2,208,482 | Victor | July 16, 1940 |
| 2,240,252 | Bernstein | Apr. 29, 1941 |
| 2,816,784 | Stucke | Dec. 17, 1957 |